United States Patent
Schmidt et al.

(10) Patent No.: US 11,803,679 B2
(45) Date of Patent: Oct. 31, 2023

(54) PETRO-TECHNICAL GLOBAL FLUID IDENTITY REPOSITORY

(71) Applicant: Schlumberger Technology Corporation, Sugar Land, TX (US)

(72) Inventors: Kurt Andreas George Schmidt, Calgary (CA); Bibek Bhattacharya, Chinnor (GB); Guillaume Rannou, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 397 days.

(21) Appl. No.: 16/754,129

(22) PCT Filed: Oct. 5, 2017

(86) PCT No.: PCT/US2017/055225
§ 371 (c)(1),
(2) Date: Apr. 6, 2020

(87) PCT Pub. No.: WO2019/070256
PCT Pub. Date: Apr. 11, 2019

(65) Prior Publication Data
US 2020/0334398 A1    Oct. 22, 2020

(51) Int. Cl.
*G06F 30/20* (2020.01)
*E21B 49/08* (2006.01)
(Continued)

(52) U.S. Cl.
CPC ............ *G06F 30/28* (2020.01); *E21B 49/087* (2013.01); *G06F 8/65* (2013.01); *G06F 30/20* (2020.01);
(Continued)

(58) Field of Classification Search
CPC ........ G06F 30/20; G06F 8/65; G06F 2113/08; E21B 49/087; E21B 2200/20; E21B 43/017
(Continued)

(56) References Cited

U.S. PATENT DOCUMENTS

2009/0125362 A1    4/2009   Reid et al.

FOREIGN PATENT DOCUMENTS

WO    2016/115414 A1    7/2016
WO    2016/172006 A1    10/2016
(Continued)

OTHER PUBLICATIONS

International Search Report and Written Opinion for the counterpart International patent application PCT/US2017/055225 dated Jan. 11, 2018.
(Continued)

*Primary Examiner* — John E Johansen
(74) *Attorney, Agent, or Firm* — Jeffrey D. Frantz

(57) ABSTRACT

A global fluid identity repository is used to maintain and manage fluid characterization data for various fluids utilized in the oil & gas industry, e.g., reservoir fluids within subsurface formations. Tracking and notification services may be utilized to track changes made to a global fluid identity, e.g., changes in fluid sample and/or experiment data for a fluid, and automatically generate notifications when downstream data such as fluid models and/or simulation results become stale as a result of these changes.

16 Claims, 10 Drawing Sheets

(51) Int. Cl.
  *G06F 113/08* (2020.01)
  *G06F 30/28* (2020.01)
  *G06F 8/65* (2018.01)

(52) U.S. Cl.
  CPC ....... *E21B 2200/20* (2020.05); *G06F 2113/08* (2020.01)

(58) Field of Classification Search
  USPC .......................................................... 703/10
  See application file for complete search history.

(56) References Cited

FOREIGN PATENT DOCUMENTS

| WO | 2017/004476 | A1 | | 1/2017 | | |
|---|---|---|---|---|---|---|
| WO | WO-2017004476 | A1 | * | 1/2017 | ......... | E21B 41/0092 |
| WO | 2017/027068 | A1 | | 2/2017 | | |

OTHER PUBLICATIONS

International Preliminary Report on Patentability for the counterpart International patent application PCT/US2017/055225 dated Apr. 16, 2020.

Jefferson et al.; "A Scaleable, Database Architecture for Storage of PVT Data"; Society of Petroleum Engineers, (SPE 35988) SPE Petroleum Computer Conference Dallas, TX, Jun. 2-5, 1996.; pp. 145-147.

Aydelotte et al.; "Delivering a PRODML Data-Exchange Standard for PVT and Fluid Characterization Data for the Full Lifecycle of a Reservoir"; SPE-173425-MS; SPE Digital Energy Conference and Exhibition Woodlands, TX, Mar. 3-5, 2015; 15 pages.

Aydelotte et al.; Powerpoint explaining SPE-173425-MS: Delivering a PRODML Data-Exchange Standard for PVT and Fluid Characterization Data for the Full Lifecycle of a Reservoir; SPE Digital Energy Conference and Exhibition Woodlands, TX, Mar. 3-5, 2015; 23 slides.

* cited by examiner

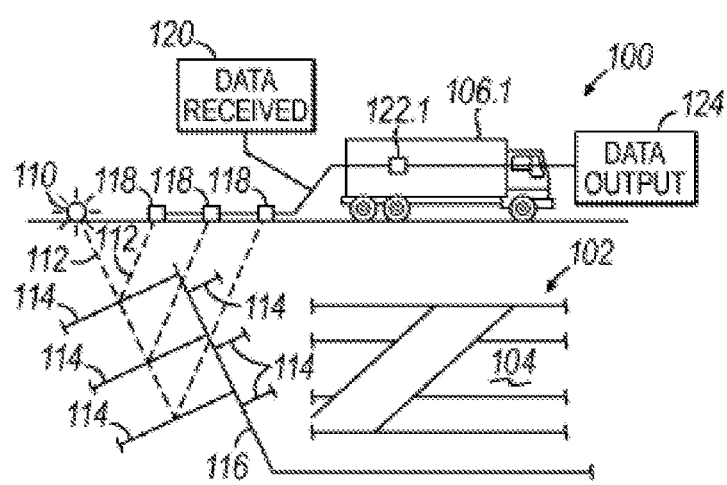
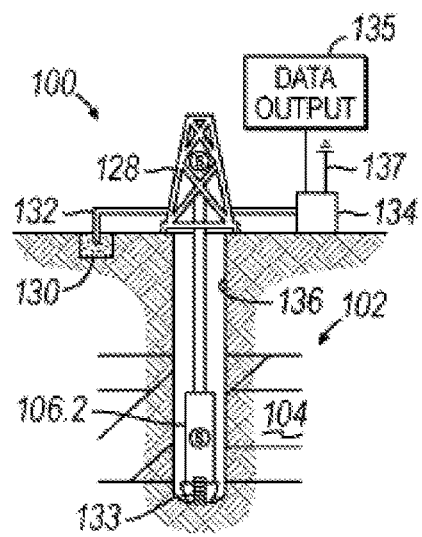
FIG. 1A
FIG. 1B
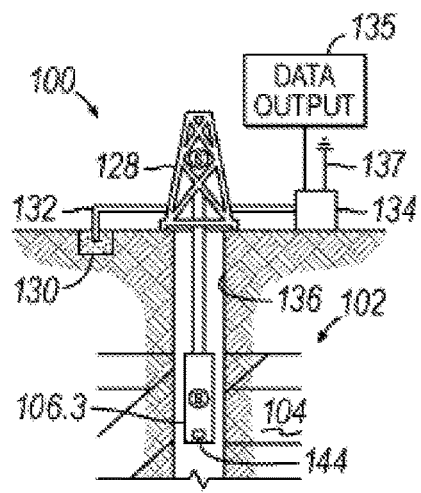
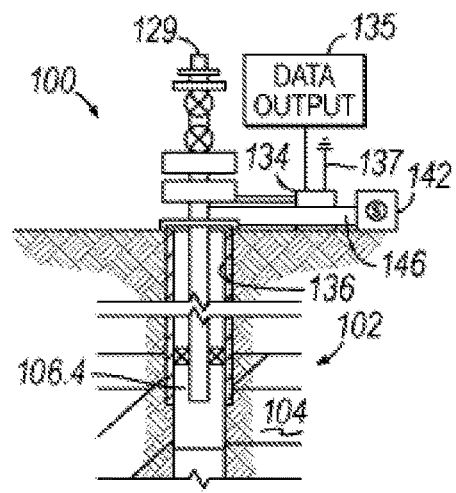
FIG. 1C
FIG. 1D

PETRO-TECHNICAL GLOBAL FLUID IDENTITY REPOSITORY

BACKGROUND

Fluid simulation is used in the oil & gas industry to model the physical properties of petrochemicals, as the physical properties of such fluids can have a significant impact on the extraction, production and flow of such fluids within a petroleum production system. Fluids recovered from a reservoir generally include hydrocarbons of various molecular weights and other organic compounds, as well as some proportion of water, and depending upon the temperature and pressure to which such fluids are exposed, such fluids may include varying concentrations of liquid and gas components. Fluid models generated by fluid simulations may also be used by various types of other simulations, e.g., reservoir simulations that model the quantities and locations of recoverable hydrocarbons in reservoirs and/or the flow of such hydrocarbons within wells drilled into such reservoirs, surface network simulations that model the flow of recovered hydrocarbons through pipelines and other surface production components, etc.

Fluid models may be generated and/or used by a number of different individuals and/or organizations in the oil & gas industry, including specialists in disciplines such as fluid sample analysis, fluid characterization, flow assurance, reservoir engineering and production engineering, and a number of different petro-technical computer applications may rely on various types of data that characterizes particular fluids (referred to hereinafter as fluid characterization data). The management of fluid characterization data and its relationship to particular fluids and/or reservoirs, however, is generally piecemeal and ad hoc in nature, and particularly given that the understanding of a fluid can grow as additional testing and experimentation is performed, and potentially by multiple individuals and/or organizations, it can be difficult to determine what fluid characterization data provides an optimum characterization of a particular fluid at any given time.

SUMMARY

Consistent with some embodiments of the invention, a method includes maintaining in a computer-implemented global fluid identity repository a plurality of global fluid identities, each global fluid identity including fluid characterization data characterizing a fluid associated with a reservoir in a subsurface formation, where the plurality of global fluid identities includes a first global fluid identity for a first fluid, and where the fluid characterization data for the first global fluid identity includes at least one of fluid sample data and experiment data characterizing the first fluid, fluid model data defining a fluid model, and simulation result data generated from a simulation performed with the fluid model, in the computer-implemented global fluid identity repository, tracking changes made to the plurality of global fluid identities, including tracking changes to fluid sample data, experiment data, fluid model data and simulation result data in one or more of the plurality of global fluid identities, when tracking changes in the computer-implemented global fluid identity repository, detecting a change to the at least one of the fluid sample data and the experiment data for the first global fluid identity, in response to detecting the change to the at least one of the fluid sample data and the experiment data for the first global fluid identity, determining that the fluid model data for the first global fluid identity is stale, and in response to determining that the fluid model data for the first global fluid identity is stale, generating a notification indicating that the fluid model for the first global fluid identity is stale.

In some embodiments, generating the notification includes generating the notification for display in a simulation application. In addition, in some embodiments, generating the notification includes generating the notification for display in a fluid viewing application. In some embodiments, generating the notification includes generating the notification for display in a fluid modeling application. In some embodiments, generating the notification includes generating an electronic message for display to a user, the electronic message including a text message, an email or a pop-up notification. In some embodiments, generating the notification includes generating a user control for display with the notification to enable a user to initiate an update to the fluid model for the first global fluid identity. In addition, in some embodiments, the user control is configured for display in a simulation application, a fluid viewing application or a fluid modeling application.

In addition, some embodiments may further include automatically initiating an update to the fluid model for the first global fluid identity in response to determining that the fluid model data for the first global fluid identity is stale. Some embodiments may also include determining that the simulation result data for the first global fluid identity is stale, and after automatically initiating the update to the fluid model for the first global fluid identity, automatically initiating an updated simulation for the first global fluid identity using the updated fluid model.

In some embodiments, each global fluid identity in the global fluid identity repository includes a plurality of entities storing the fluid characterization data therefor. Moreover, in some embodiments, each entity among the plurality of entities includes one or more versions, and where determining that the fluid model data for the first global fluid identity is stale includes determining that a version of a first entity associated with the fluid model data for the first global fluid identity was generated using a prior version of a second entity associated with the at least one of the fluid sample data and the experiment data for the first global fluid identity. In some embodiments, at least one entity among the plurality of entities includes one or more entity links to other entities among the plurality of entities to represent dependencies between linked entities. In some embodiments, at least one entity among the plurality of entities identifies one or more source applications for fluid characterization data associated with the at least one entity. In addition, in some embodiments, the plurality of entities includes a model entity associated with fluid model data and an artefact entity associated with simulation result data.

In some embodiments, the computer-implemented global fluid identity repository is resident in a cloud platform. Moreover, in some embodiments, the cloud platform includes a search and retrieval service executing in a service container of the cloud platform. Also, in some embodiments, the cloud platform includes a publish service executing in a service container of the cloud platform. In some embodiments, the cloud platform includes a notification service.

Some embodiments may also include an apparatus including at least one processing unit and program code configured upon execution by the at least one processing unit to perform any of the methods discussed herein. Some embodiments may also include a program product including a computer readable medium and program code stored on the computer readable medium and configured upon execution by at least one processing unit to perform any of the methods discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter

BRIEF DESCRIPTION OF THE DRAWINGS

FIGS. 1A-1D illustrate simplified, schematic views of an oilfield having subterranean formations containing reservoirs therein in accordance with implementations of various technologies and techniques described herein.

DETAILED DESCRIPTION

Figure 2:
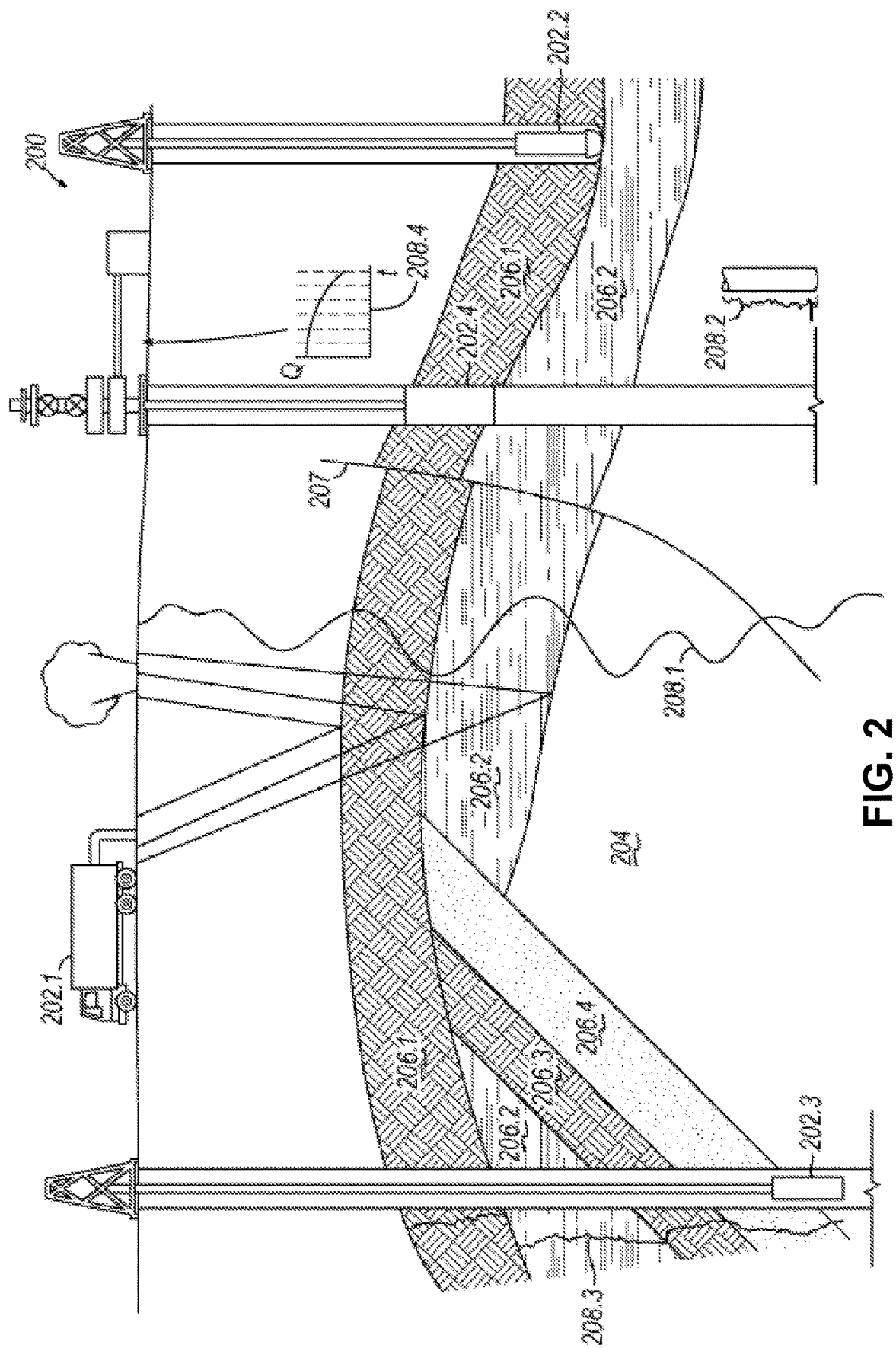
FIG. 2 illustrates a schematic view, partially in cross section of an oilfield having a plurality of data acquisition tools positioned at various locations along the oilfield for collecting data from the subterranean formations in accordance with implementations of various technologies and techniques described herein.

In the embodiments discussed hereinafter, a global fluid identity repository is used to maintain and manage fluid characterization data for various fluids utilized in the oil & gas industry. Prior to a discussion of these embodiments, however, a brief overview of oilfield operations are provided below.

Oilfield Operations

FIGS. 1A-1D illustrate simplified, schematic views of an oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 3:
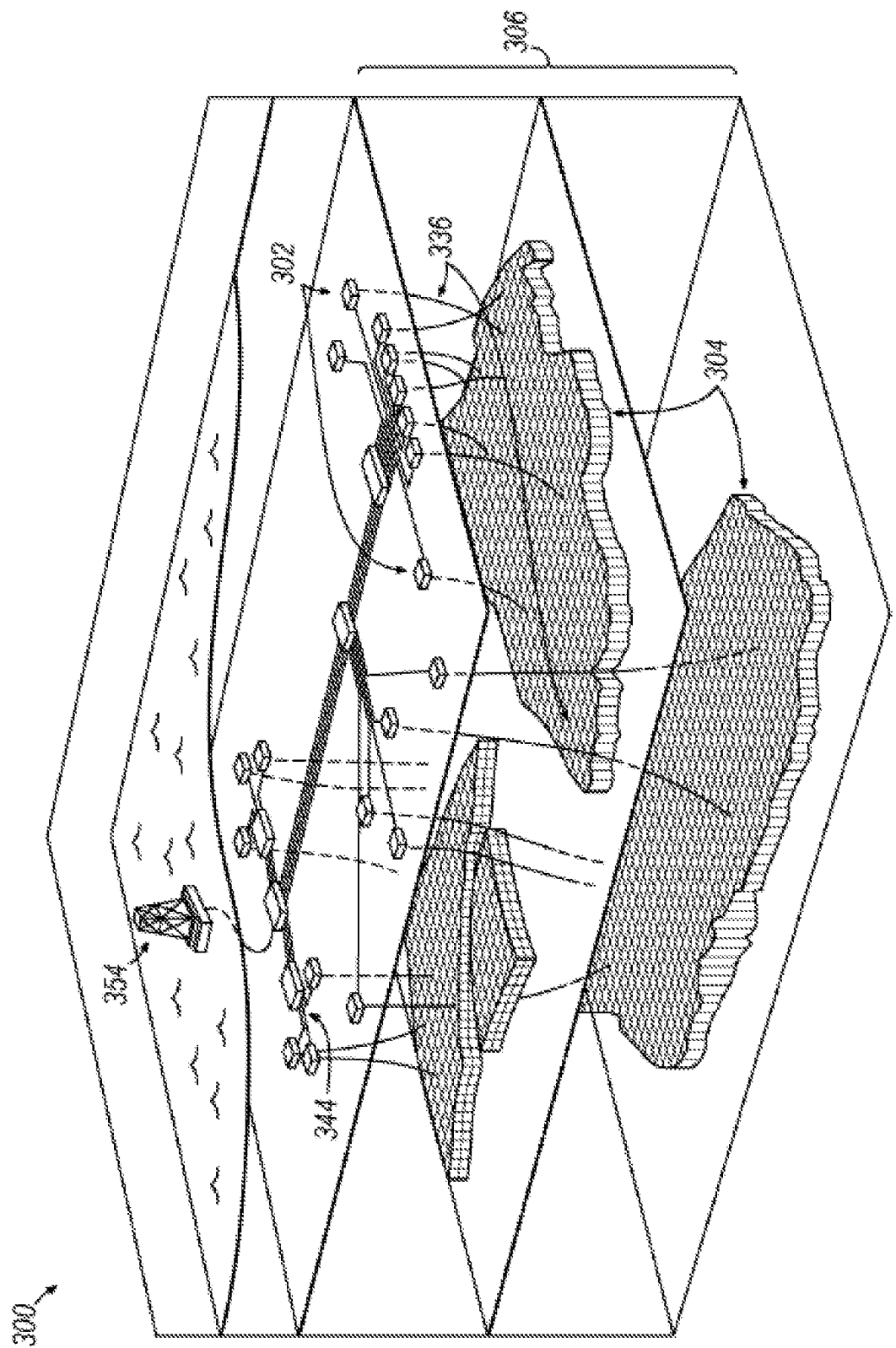
FIG. 3 illustrates a production system for performing one or more oilfield operations in accordance with implementations of various technologies and techniques described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Cloud-Based Petro-Technical Environment

Figure 4:
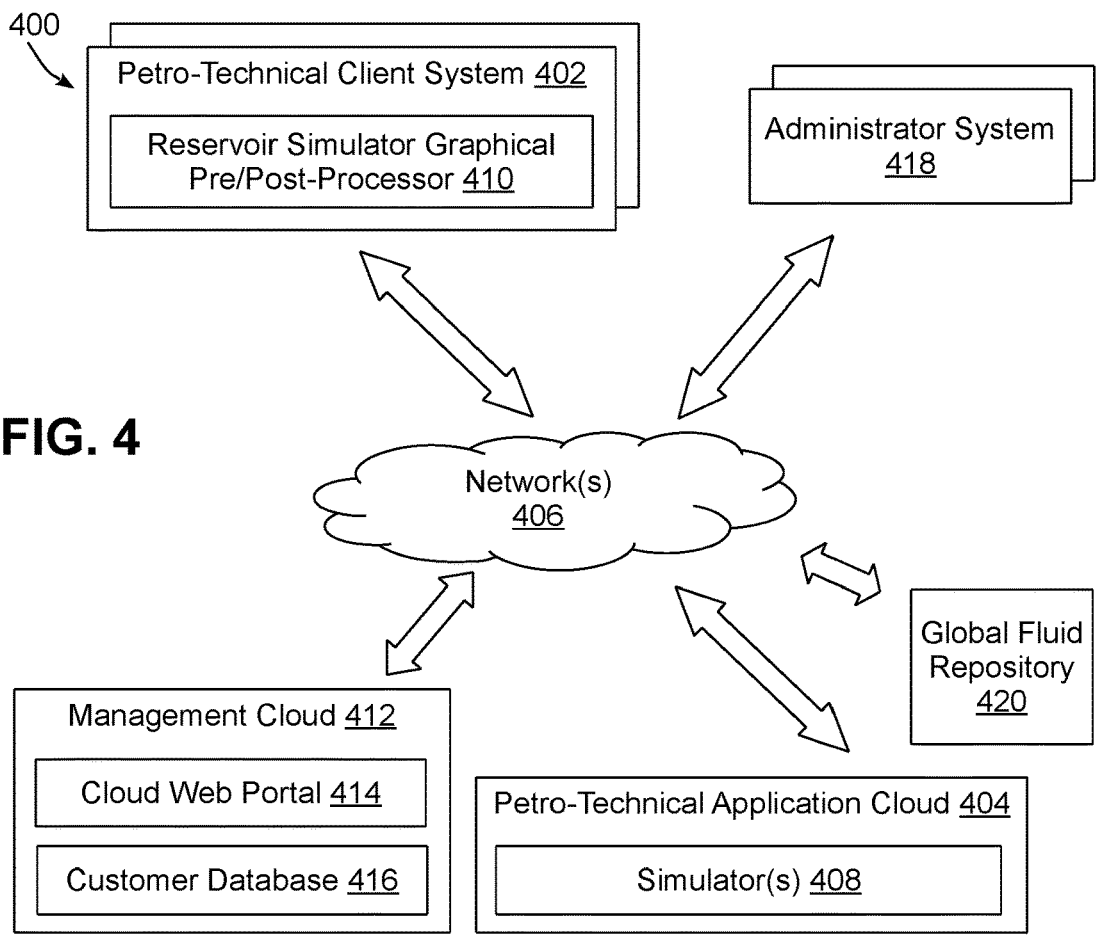
FIG. 4 is a block diagram of an example hardware and software environment for a data processing system in accordance with implementation of various technologies and techniques described herein.

In some embodiments consistent with the invention, a global fluid repository may be implemented within a cloud-based petro-technical environment. FIG. 4, for example, illustrates an example data processing system 400 in which the various technologies and techniques described herein may be implemented in some embodiments. System 400 may incorporate, for example, one or more petro-technical client computer systems 402 capable of accessing a petro-technical application cloud 404 via one or more networks 406. One or more simulators 408, e.g., a reservoir simulator, a fluid simulator, a surface facilities simulator, and/or a pipeline simulator, among others, may be resident in petro-technical application cloud 404 for use in executing simulations and/or modeling fluids submitted by a client computer system 402, e.g., via a graphical pre/post-processor 410. In addition, a separate management cloud 412 may be utilized to provide external access to a client web portal 414 and customer database 416, the former of which may be accessed by client computer system(s) 402 and the latter of which may be accessed by one or more administrators, e.g., via an administrator computer system 418. Client web portal 414, for example, may be used to implement various cloud-related management operations such as account management, job creation and submission, etc.

Furthermore, data processing system 400 may also include a global fluid repository 420, which as will be discussed in greater detail below, may be used to maintain a "global fluid identity" for a fluid, in part by maintaining fluid characterization data collected and/or generated for a fluid and tracking various revisions and refinements of the fluid.

Computer systems 402, 418 may be implemented as various types of computers, e.g., desktop computers, laptop computers, tablets, mobile devices, etc. In some embodiments, such computer systems may be implemented as server-type computers, and further, in some embodiments multiple networked computer systems may be used to support a particular client, customer or administrator, e.g., through a client-server architecture, a web-based architecture, a remote desktop architecture, a virtual machine architecture, etc. Computer systems 402, 418, as such, may be implemented using practically any type of computer that may be external to but otherwise capable of interacting with a cloud computing environment.

Figure 5:
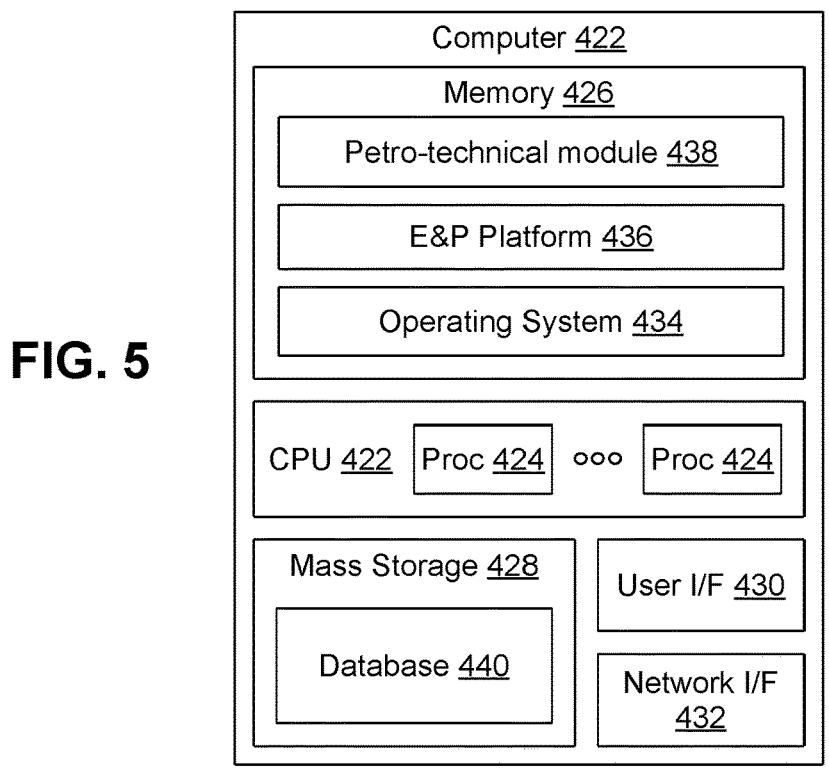
FIG. 5 is a block diagram of an example hardware and software environment for the client system referenced in FIG. 4.

FIG. 5, for example, illustrates an example computer 422 that may be used to implement either of computer systems 402, 418 in some embodiments. Computer 422 may include a central processing unit (CPU) 422 including at least one hardware-based processor or processor core 424. CPU 422 is coupled to a memory 426, which may represent the random access memory (RAM) devices comprising the main storage of a computer 422, as well as any supplemental levels of memory, e.g., cache memories, non-volatile or backup memories (e.g., programmable or flash memories), read-only memories, etc. In addition, memory 426 may be considered to include memory storage physically located elsewhere in a computer, e.g., any cache memory in a microprocessor or processing core, as well as any storage capacity used as a virtual memory, e.g., as stored on a mass storage device 428 or on another computer coupled to a computer 422.

Computer 422 also generally receives a number of inputs and outputs for communicating information externally. For interface with a user or operator, computer 422 generally includes a user interface 430 incorporating one or more user input/output devices, e.g., a keyboard, a pointing device, a display, a printer, etc. Otherwise, user input may be received, e.g., over a network interface 432 coupled to a network, from one or more external computers. Computer 422 also may be in communication with one or more mass storage devices 428, which may be, for example, internal hard disk storage devices, external hard disk storage devices, storage area network devices, etc.

Computer 422 generally operates under the control of an operating system 434 and executes or otherwise relies upon various computer software applications, components, programs, objects, modules, data structures, etc. For example, a petro-technical module or component 438 executing within an exploration and production (E&P) platform 436 may be used to access, process, generate, modify or otherwise utilize petro-technical data, e.g., as stored locally in a database 440 and/or accessible remotely (e.g., from a collaboration platform). Platform 436 and/or one or more petro-technical modules 438 may, in some embodiments, implement graphical pre- and/or post-processing in connection with cloud-based reservoir simulation as described herein. In one non-limiting embodiment, for example, E&P platform 436 may implemented as the PETREL Exploration & Production (E&P) software platform, which may further access a collaboration platform such as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

Figure 6:
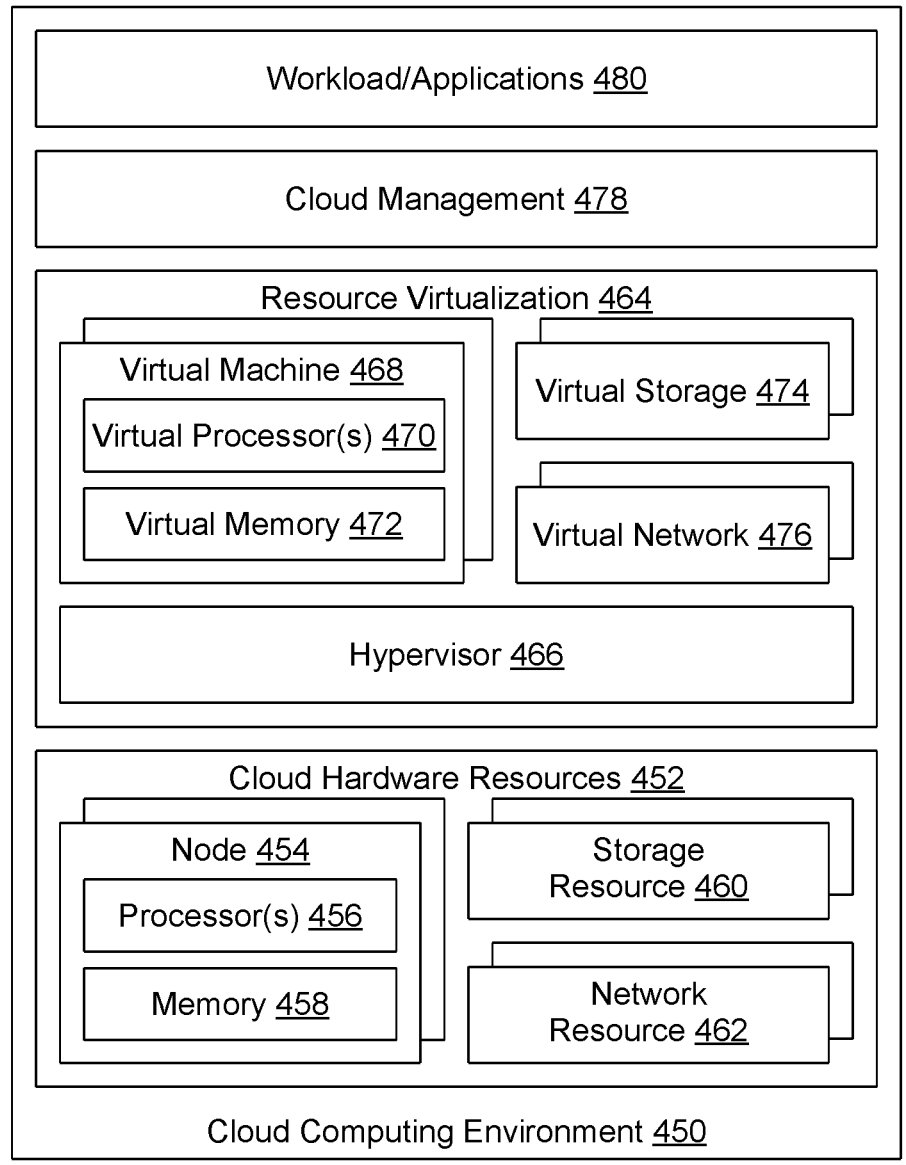
FIG. 6 is a block diagram of an example cloud computing environment suitable for implementing the management cloud, the petro-technical application cloud and/or the global fluid repository referenced in FIG. 4.

Returning to FIG. 4, each of petro-technical application cloud 404, management cloud 412 and global fluid repository 420 may be implemented as a cloud computing environment, an example of which is illustrated at 450 in FIG. 6. In cloud computing environment, a set of cloud hardware (physical) resources 452, e.g., computing resources (represented by a plurality of compute nodes 454 that include both processor resources 456 and memory resources 458), storage resources 460 and network resources 462 are generally virtualized by resource virtualization and cloud management functionality to provision one or more "clouds" for access by different users, thereby providing a service offering on-demand access to a shared pool of configurable computing resources that can be provisioned and released with minimal management effort or interaction with a provider of the service. Clouds may generally be public, private or hybrid in nature, and it will be appreciated that any number of cloud computing environments and/or services may be utilized in different embodiments of the invention.

Various abstraction layers may be employed in cloud computing environment 450. For example, a resource virtualization layer 464 may be used to virtualize the cloud hardware resources 452, e.g., using one or more hypervisors or virtual machine monitors 466 to create and manage virtual machines 468 including virtual processors 470 and virtual memory 472, as well as virtual storage 474 and/or virtual networks 476 that may be utilized by the virtual machines 468. It will be appreciated that the cloud hardware resources 452 may be implemented using a wide variety of architectures, including mainframes, servers, blade servers, supercomputers, and practically any other hardware architecture used in connection with virtualization, and may be arranged into various groupings such as nodes, hosts, groups, pools, racks, units, data centers, etc. In addition, a cloud management layer 478 may be used to manage cloud-related functionality such as the provisioning and/or management of clouds, customer/client management, billing, security management, authentication, etc. Collectively, for example, resource virtualization layer 464 and cloud management layer 478 may be used to provision hardware resources and implement a cloud on behalf of a customer, thereby enabling various workloads (e.g., one or more applications) 480 to be installed and executed in the implemented cloud.

In one example embodiment, for example, workload 480 may include a reservoir simulator or other petro-technical application, e.g., the INTERSECT high-resolution reservoir simulator available from Schlumberger Ltd. and its affiliates. In addition, while cloud computing environment 450 is suitable for hosting management cloud 412, petro-technical application cloud 404 and global fluid repository 420 in the illustrated embodiment, it will be appreciated that different types and/or quantities of hardware resources may be provisioned for these different tasks. As will become more apparent below, for example, a petro-technical application cloud 404 in some embodiments may be provisioned with high performance hardware resources suitable for handling reservoir simulation workloads, e.g., a high performance computing (HPC) cluster of high performance compute nodes interconnected by high speed interconnects, e.g., using the InfiniBand or another high speed networking protocol. As such, petro-technical application cloud 404 may also be referred to herein as an HPC cloud cluster.

In general, the routines executed to implement the embodiments disclosed herein, whether implemented as part of an operating system, kernel, middleware, hypervisor, firmware, or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers, computer systems and computing environments, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIGS. 4-6 is not intended to limit the invention. Indeed, those skilled in the art will recognize that other alternative hardware and/or software environments may be used without departing from the scope of the invention.

Returning again to FIG. 4, in some embodiments consistent with the invention, a simulator 408, e.g., a reservoir simulator, fluid simulator, or other petro-technical application may be provisioned within a petro-technical application cloud 404, and may be combined with a graphical pre/post-processor 410 resident in a client computer system 402 external to the provisioned cloud 404 to provide a services offering that leverages flexibility and economies of scale for running simulation models generally from any location, and without the need of a dedicated compute infrastructure. In some embodiments consistent with the invention, for example, a service offering may be implemented using public and/or private high performance cloud computing environments for reservoir simulation. In addition, management cloud 412 may be used to provide a cloud web portal 414 for customer registration and subscription using a client computer system 402, as well as for administration and user entitlements management by an administrator from an administrator system 418. Management cloud 412 may also maintain a customer database 416 to maintain customer subscriptions, manage provisioning of cloud service infrastructure, handle billing and cost tracking, etc.

Further, as will be discussed in greater detail below, once a cloud 404 is provisioned for a customer, a simulation model may be prepared by that customer using graphical pre/post-processor 410 and packaged into a simulation job that may be submitted to the cloud 404 for execution thereby. In some embodiments, data security is also provided during transfer of data to and from the cloud, when data is at rest on the cloud and while the simulation job is executing on the cloud, and in some embodiments, job status reporting and monitoring may be supported during simulation execution. Once a simulation is complete, results may be returned and displayed by graphical pre/post-processor 410.

In other embodiments, however, simulators 408 and/or other petro-technical applications may be run on non-cloud computing environments, e.g., locally on a client computer or on a server computer, as a global fluid repository may be accessible by one or both of cloud and non-cloud environments in various embodiments of the invention. Moreover, while petro-technical application cloud and global fluid repository are both illustrated in FIG. 4 as cloud-based services, in other embodiments the functionality implemented in one or both of these services may be implemented in non-cloud environments that nonetheless provide for collaborative access by multiple users. Therefore, the invention is not limited to the particular cloud-based environments and implementations discussed herein.

Global Fluid Identity Repository

A global fluid identity repository consistent with some embodiments of the invention may be used, for example, to provide for collaborative data modelling in a cloud, e.g., by various specialists in the oil and gas industry and involved in various disciplines such as fluid sample analysis, fluid characterization, flow assurance, reservoir engineering and production engineering. As will become more apparent below, a global fluid identity repository provides in part a chain of custody associated with a global fluid identity across data stored by multiple applications, including for example reservoir fluid sample data (wellbore downhole and/or surface), lab experiment data and/or analysis reports, tuned fluid models with enhanced characterization, and/or fluid artefacts for reservoir simulation and/or production network simulation. In some embodiments, collaborating users of these various applications may be able to search, retrieve and/or publish oilfield fluid models, artefacts and metadata over multiple repositories and be able to trace the links back to the global fluid identity. In some embodiments, fluid sample data and/or experiment data may also include downhole-collected data, e.g., as may be collected during wireline logging, mud logging, drilling, etc. A global fluid identity in some embodiments may also store fluid models and/or fluid model-generated states of a modeled fluid at a particular point in time, along with an appropriate time stamp.

Figure 7:
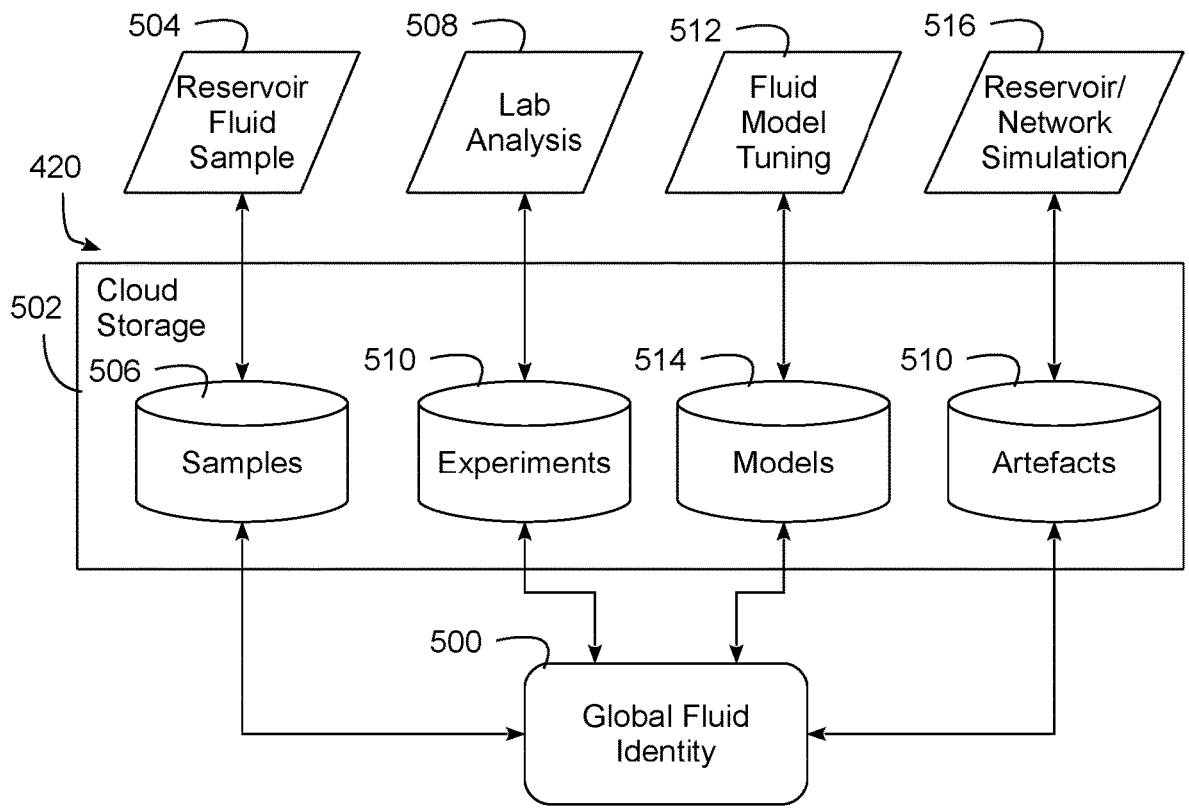
FIG. 7 is a block diagram illustrating multi-application chain of custody for the global fluid identity repository of FIG. 4.

FIG. 7, for example, illustrates one example of multi-application chain of custody for global fluid identity repository 420 of FIG. 4, in which a global fluid identity 500 links to and associates together various types of entities maintained in a cloud storage system 502 and associated with a given fluid, e.g., fluid sample data generated at a reservoir fluid sample stage 504 and maintained in one or more sample repositories 506, experiment data generated at a lab analysis stage 508 and maintained in one or more experiment repositories 510, fluid models generated at a fluid model tuning stage 512 and maintained in one or more model repositories 514, and fluid artefacts generated at a reservoir and/or network simulation stage 516 and maintained in one or more artefact repositories 518. As will become more apparent below, versioning may also be implemented in a global fluid repository in some embodiments such that as addition fluid samples, lab analysis, tuning and/or simulation is performed, the global fluid identity may evolve yet still provide an ability to access and/or reconstruct prior versions.

A global fluid identity repository in some embodiments may be implemented as a portable, versioned model repository system for oilfield and/or petro-technical fluids, and may be deployed in a cloud platform-as-a-service (PAAS) environment and/or a non-cloud platform (e.g., an on-premises data processing system), and generally avoiding software porting or modifications when accessed by different systems. A global fluid identity repository also desirably addresses various non-functional requirements including performance, scalability, availability and security in some embodiments, and may be used to provide fluid models that are intuitive to create, easy to share, consistent and appropriate for multiple applications, whether within a single organization or across multiple organizations.

In some embodiments, a global fluid identity repository may be utilized to provide functionality to search, retrieve and publish oilfield fluid models, artefacts and/or metadata from multiple applications and over multiple repositories, and enable links to be traced back to a single global fluid identity. Doing so may facilitate data flows between different applications by use of standard or shared schemas of model artefact representations stored in various repositories. Furthermore, by emphasizing portability, it may be feasible to collocate related repository services on the same cloud platform, thus facilitating multi-application integration. A versioning system may also be incorporated to provide resilience in a multi-user collaboration context offering safety against accidental overwrite of one user's changes with another's. Versioning of model entities may be combined with user generated metadata to provide provenance of data and operations and maintain consistent links to a global fluid identity, and an authentication and authorization system may be used to restrict the flow of data and thereby comply with organization defined security policies.

Conventionally, data integration between applications, e.g., within the oil & gas industry, may be achieved through exchange of flat files on desktop filesystems, which has been found to be prone to human error, open to tampering and problematic when attempting to carry out multiple iterations. In some embodiments consistent with the invention, on the other hand, big data/platform-as-a-service techniques, e.g., container based deployment, event-driven, non-blocking I/O models, noSQL data modelling and/or RESTful API designs, may be used to facilitate data integration. In some embodiments, for example, entities stored in a fluid-related repository may be tagged to facilitate searching, and related entities may be linked to facilitate navigation therebetween. A global fluid identity repository consistent with some embodiments of the invention may also be used to provide users with instant access to related entity links for different types of entities, e.g. which fluid sample was used to generate certain fluid artefacts used in a certain simulation. Further, in some embodiments, notification and subscription functionality may be employed such that users subscribing to tags may be automatically notified when another user publishes a newer version of an entity.

Figure 8:
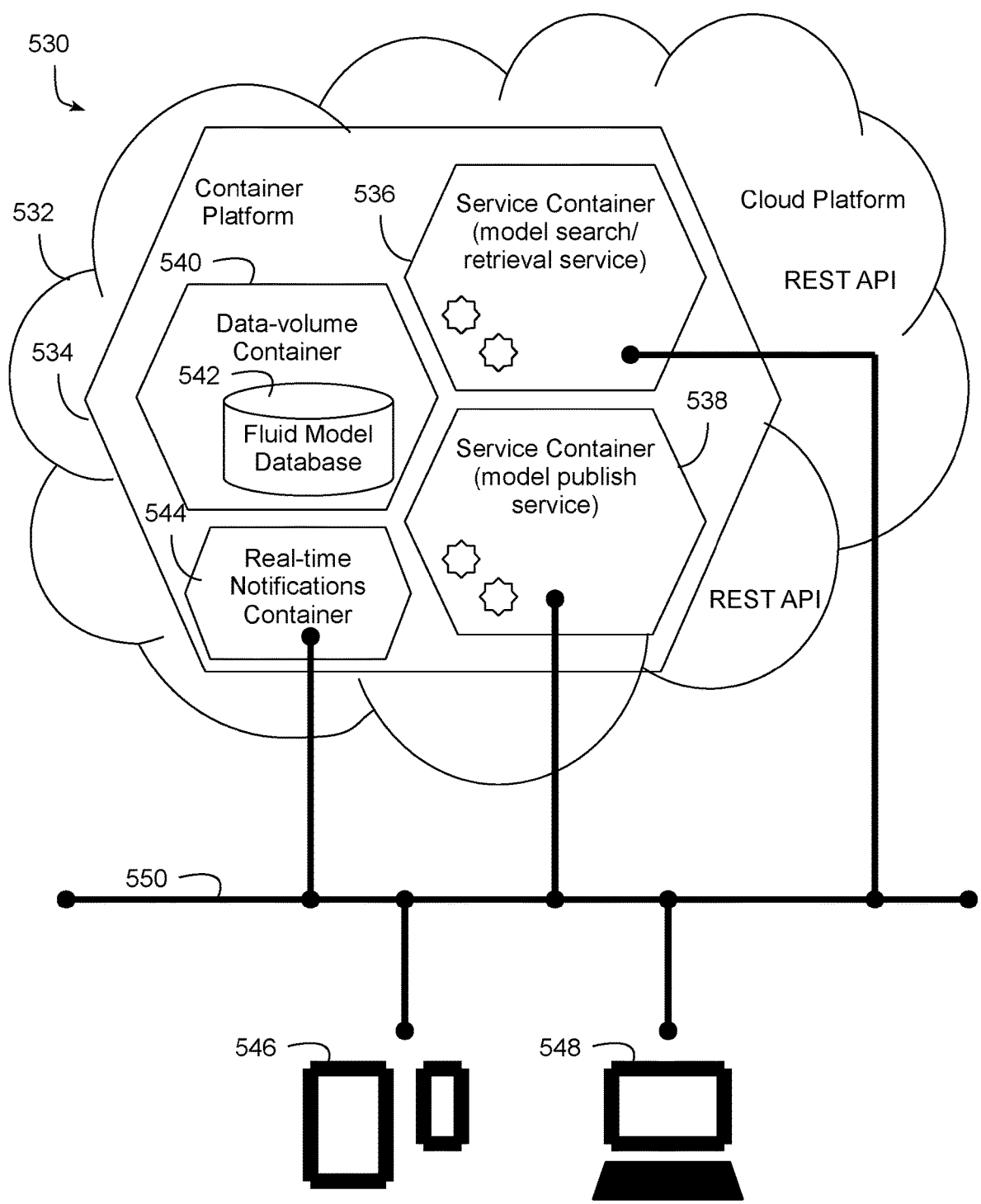
FIG. 8 is a block diagram illustrating an example cloud-based implementation of the global fluid identity repository of FIG. 4.

FIG. 8 next illustrates an example architecture of a cloud-based global fluid identity repository 530 consistent with some embodiments of the invention. In this embodiment, one or more services are deployed to a cloud platform 532, which hosts a container platform 534 that in turn hosts individual services, e.g., a model search/retrieval service hosted in a service container 536 and a model publish service hosted in a service container 538. A data-volume container 530 hosts a storage system within a database engine, e.g., a fluid model database 542, and a real-time notifications container 544 hosts a notification service that notifies users of changes made to global fluid identities, e.g., certain global fluid identities with which users have subscribed to receive notifications related thereto. Container platform 534 generally provides portability across multiple cloud platforms, and containers 536, 538, 540 and 544 may be implemented similar to virtual machines but with a lighter weight, e.g., to enable a container to be started in seconds rather than minutes, which may be beneficial in terms of addressing elastic scalability on the cloud. Each container may also provide similar benefits of a virtual machine in terms of machine addressability, runtime environment isolation and resilience in deployment through fine grained control over the installed image. As such, container platform 534 may be considered to implement a network of containers located transparently across one or many physical machines.

User interface applications, e.g., via web or browser-based interfaces, remote desktop interfaces, mobile application interfaces, desktop application interfaces, etc., may reside on various client devices, e.g., mobile devices 546 such as tablets or smartphones, single-user computers 548 such as laptops, desktops or workstations, or other client devices, and may be connected securely over a network 550, e.g., including wired and/or wireless public and/or private networks, to the services deployed on cloud platform 530.

Figure 9:
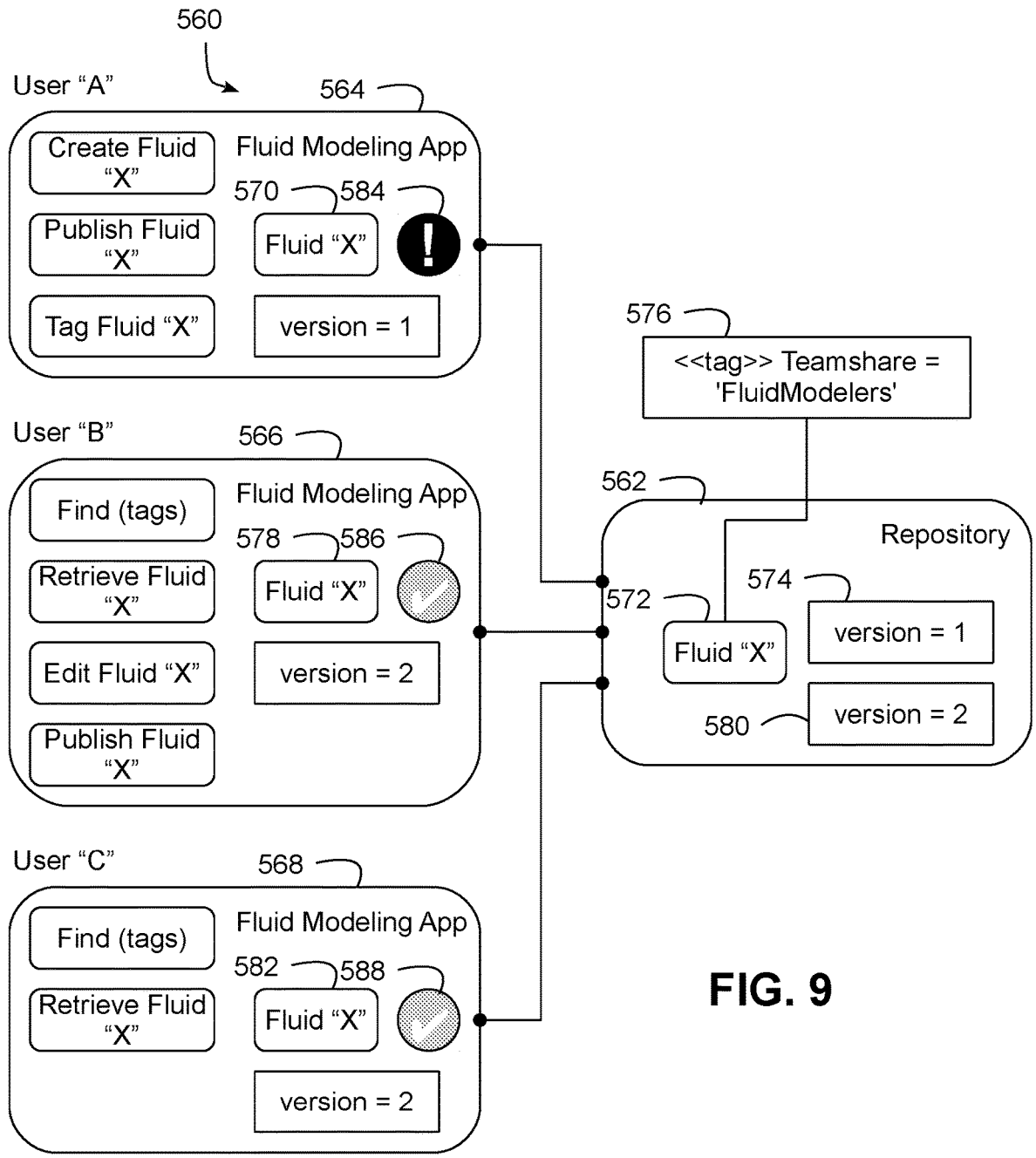
FIG. 9 illustrates a flowchart of an example workflow for accessing the global fluid identity repository of FIG. 4.

It will be appreciated that a wide variety of workflows may be supported using a global fluid identity repository consistent with the invention. FIG. 9, for example, illustrates an example workflow 560 illustrating the interaction of three users (Users "A", "B" and "C") with a global fluid identity repository 562, and using three different fluid modeling applications 564, 566 and 568.

User "A" operating fluid modeling application 564 is shown performing three tasks to generate a fluid model 570 for a Fluid "X." As illustrated in FIG. 9, User "A" may create the local fluid model 570 in fluid modeling application 570. At this point, the fluid model is considered to be local to User "A".

Next, User "A" may publish the fluid model to the global fluid identity repository 562 to cause the global fluid identity repository to generate a global fluid identity 572 for Fluid "X." As the global fluid identity has initially been created by User "A", an initial version (e.g., version=1) may be assigned to global fluid identity 570, as represented at 574, and fluid modeling application 564 may maintain this version identifier to indicate that the local fluid model 570 matches version 1 of global fluid identity 572.

Next, User "A" may tag Fluid "X" with a tag, e.g., tag 576, which assigns a "Teamshare" variable a tag of "Fluid-Modelers." Tagging of Fluid "X" with tag 576 may be used to enable other users of global fluid identity repository 562 to access the global fluid identity 572 for Fluid "X", and in some embodiments, may be used to control which users are permitted access to the global fluid identity. In other embodiments, a separate authorization infrastructure in the cloud platform may be used to restrict access to global fluid identities to authorized users or groups of users.

Next, User "B" operating fluid modeling application 566 is shown performing a find task to perform a search of global fluid identity repository 562 to locate one or more global fluid identities matching a particular search criterion. For the purposes of this example, it may be assumed that the search criterion identifies Fluid "X," and as such, User "B" next retrieves a fluid model 578 for Fluid "X" from repository 562, and based upon version 1 of the global fluid identity 572. Thereafter, however, User "B" edits the fluid model for Fluid "X", e.g., by tuning the fluid model, adding fluid sample and/or experiment data and rerunning the fluid model, etc., such that fluid model 578 now differs from fluid model 570 resident in fluid modeling application 564. User "B" may then publish the modified fluid model for Fluid "X" to repository 562, thereby causing repository 562 to update global fluid identity 572, and updating the version of the global fluid identity to version 2, as illustrated at 580. The identifier for this version is returned to fluid modeling application 566, such that fluid model 578 is identified as matching version 2 of global fluid identity 572.

Thereafter, assume that User "C" operating fluid modeling application 568 performs a find task to perform a search of global fluid identity repository 562 to locate one or more global fluid identities matching a particular search criterion. For the purposes of this example, it may be assumed that the search criterion identifies Fluid "X," and as such, User "C" next retrieves a fluid model 582 for Fluid "X" from repository 562, and based upon version 2 of the global fluid identity 572.

In addition, as represented by icons 584, 586 and 588, in some embodiments a notification service may be used to notify users when their local version of a fluid model is either out-of-date (i.e., does not match the current version of the global fluid identity 572, as is the case with fluid model 570 in fluid modeling application 564) or current (i.e., does match the current version of the global fluid identity 572, as is the case with fluid models 578 and 582 in fluid modeling applications 566 and 568).

In some embodiments, for example, users may be alerted when their local fluid models or other fluid characterization data are out-of-date compared to the current version of the global fluid identity and/or when their local fluid models are current. Alerts or notifications in some embodiments may take the form of icons and/or textual information in a user interface for an application when interacting with a fluid model or other fluid characterization data that is associated with a global fluid identity, while in other embodiments, notifications may take the form of emails, text messages, or other forms of notifications, whether viewable within a user application or external thereto.

Thus, in this scenario, three users of different fluid modelling apps are collaborating towards incremental refinement and optimization of an initial fluid model. The global fluid identity repository robustly supports storage of model entity versions.

Various other workflows and scenarios may be supported by a global fluid identity repository consistent with various embodiments of the invention. For example, FIG. 7 generally illustrates a multi-application chain of custody depicting the lifecycle of a global fluid identity as fluid characterization data transforms through different application stages. In one scenario, for example, a user may identify at simulation stage 516 that experiments performed in lab analysis stage 508 did not cover the full temperature range in the reservoir. As such, a request may be made for further experiments, which would involve obtaining more samples of the same fluid, which may no longer be available. So, the workflow may end up being reiterated through all of stages 504, 508, 512 and 516, e.g., to extend the temperature range, and incorporating additional data into the global fluid identity for the fluid. Nonetheless, the existing data stored in the global fluid identity repository may still be considered relevant, so newer versions of some of the entities maintained in the repository may be created. Through the use of the global fluid identity repository, however, a user may be able to follow the changes in the entities and resume simulations with a complete dataset incorporating appropriate entities and/or versions of entities. In some embodiments, for example, a full version history may be maintained for all fluid characterization data and/or entities associated with a global fluid identity, and furthermore, as noted above, in some embodiments subscribed users may be automatically notified through tagging, when a newer version of the same entity is published. If any new entities are created, those entities may also be linked to the same global fluid identity and the audit trail may be merged automatically.

Figure 10:
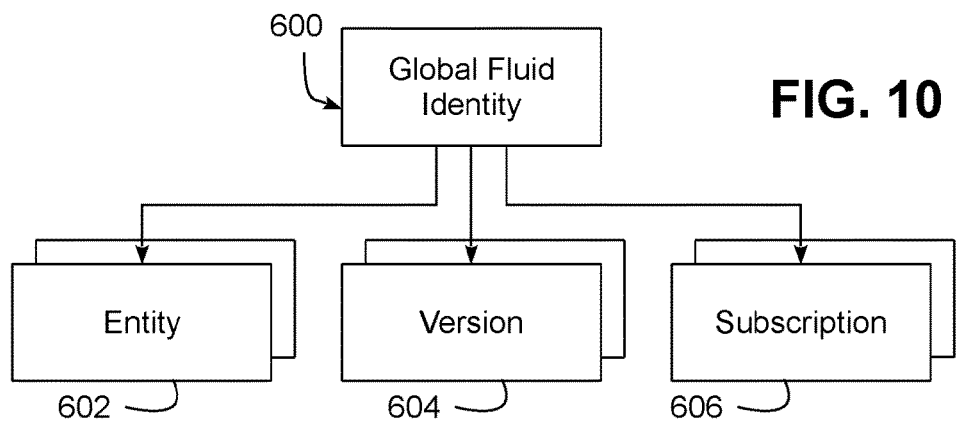
FIG. 10 is a block diagram illustrating an example global fluid identity structure for use in the global fluid identity repository of FIG. 4.
Figure 11:
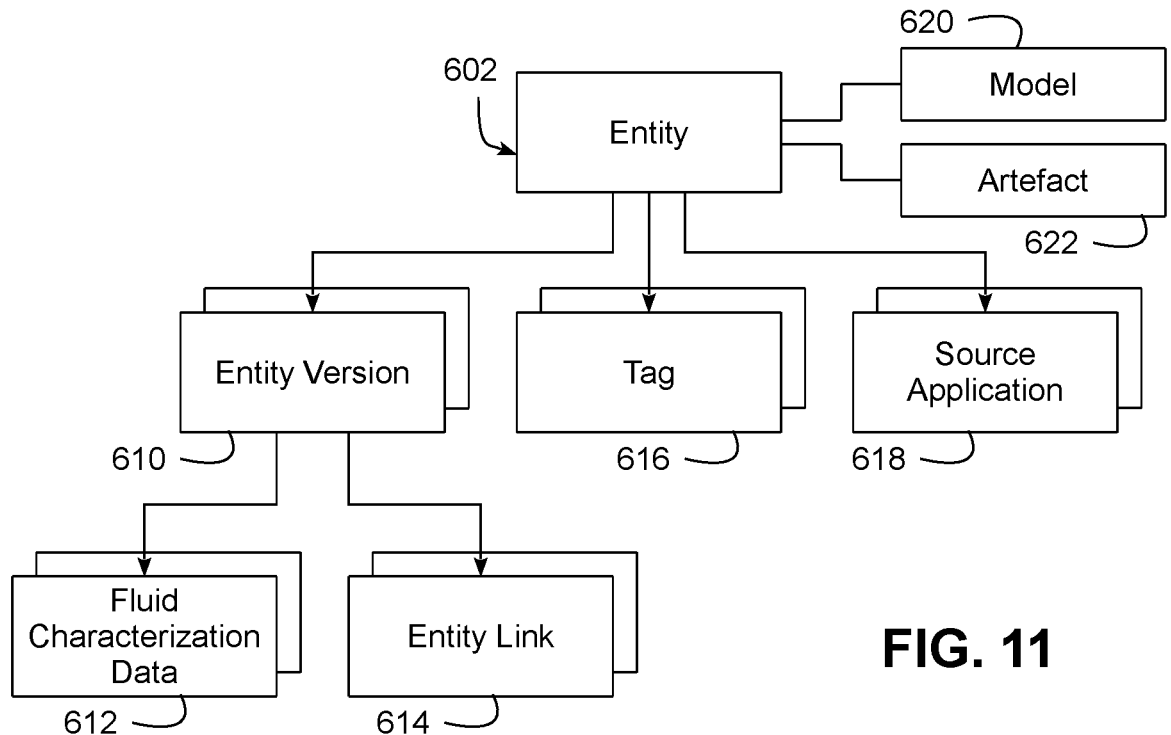
FIG. 11 is a block diagram illustrating the entity data structure referenced in FIG. 10.

Now turning to FIGS. 10-11, it will be appreciated that data within a global fluid identity repository may be represented and/or organized in an innumerable number of ways. One such representation defines a global fluid identity as a collection of entities for a given fluid. FIG. 10 illustrates at 600 one example data structure suitable for use for a global fluid identity in some embodiments of the invention. In this embodiment, a global fluid identity may be considered to include one or more entities 602, one or more versions 604 and one or more subscriptions 606.

As illustrated in greater detail in FIG. 11, an entity 602 may be considered to be an atomic data element that can be published to the repository scoped as a single transaction. An entity 602 may be uniquely identifiable, e.g., via a unique ID, and may include one or more entity versions 602, one or more tags 604 and one or more source applications 606.

Each entity version 602 may be considered to be a system generated reference of publishing a new record for an entity, and as such, each entity version 602 may include a version identifier. While the latest version represents may be considered to represent the most authoritative record of an entity in the repository, previous versions generally remain accessible for data provenance. Each entity version 602 may include one or more data structures representing fluid characterization data 608, which may be considered to include any data characterizing a fluid, e.g., fluid sample data, experiment data, fluid model data, simulation result or artefact data, etc. In addition, each entity version 602 may include one or more entity links 610, each of which represents a semantic connection from a version of an entity to a version of another entity. In some embodiments, some links may be required (e.g., in terms of forming part of the complete data definition of the current entity, such as in the case of a parent or child link), while other links may be optional.

As noted above, each entity 600 may also include one or more tags 604. A tag 604 may be considered to be an element of metadata that facilitates users to share, find and track entities within a collaborative context. The same tag can be applied to one or many entities and users, and in some embodiments, a tag is not specific to entity versions. A tag may be implemented in some embodiments as a key-value pair, although other implementations are envisioned. Also, each entity 600 may also reference one or more source applications, which may be considered to be user visible software components that can publish and retrieve versions of entities to the repository on behalf of an authenticated user.

Entity 600 as illustrated in FIG. 11 represents a generic entity data structure, and it will be appreciated that a wide variety of alternate data structures and/or alternate types of data may be incorporated into an entity in other embodiments. Furthermore, different entity types may be defined for different types of entities. For example, a model entity 612 may inherit the basic structure of entity 600, but may also include additional data providing rich semantics that can be understood only within the context of a particular source application, e.g., a fluid modeling application. Likewise, an artefact entity 614 may inherit the basic structure of entity 600, but may also include a derived representation of a model that can be understood by different applications that are aware of the representational schema at the given version. Other entity types appropriate for the creation, management, modification or use of a global fluid identity may also be envisioned.

Returning to FIG. 10, global fluid identity 600 may also include one or more versions 604. As with an entity 602, a global fluid identity may be assigned a version, and furthermore, each version may be associated with a particular set of entity versions, thereby enabling the entities that are associated with a particular version of a global fluid identity to be determined. Thus, for example, in response to a new entity version being added, a new version of a global fluid identity may be created to reflect the existence of the new entity version. In this manner, versions 604 may effectively be used similar to a log insofar as prior versions of a global fluid identity can be determined, and moreover, the versions of the entities associated with those prior versions can be determined as well. It will be appreciated that other manners of representing multiple versions of a global fluid identity may be used in other embodiments.

Global fluid identity 600 may also include one or more subscriptions 606, representing users and/or applications to be notified of updates to a global fluid identity and/or one or more of the entities associated therewith. Thus, for example, a user may subscribe to a particular global fluid identity and thereafter be notified whenever the global fluid identity and/or one of its associated entities has been updated to a new version. A subscription may be associated with a user in some embodiments, and in some embodiments, applications may be associated with a subscription, e.g., to notify a fluid modeling application or a reservoir simulation application whenever fluid characterization data associated with a particular global fluid identity and/or fluid model or simulation artefact has been modified.

Figure 12:
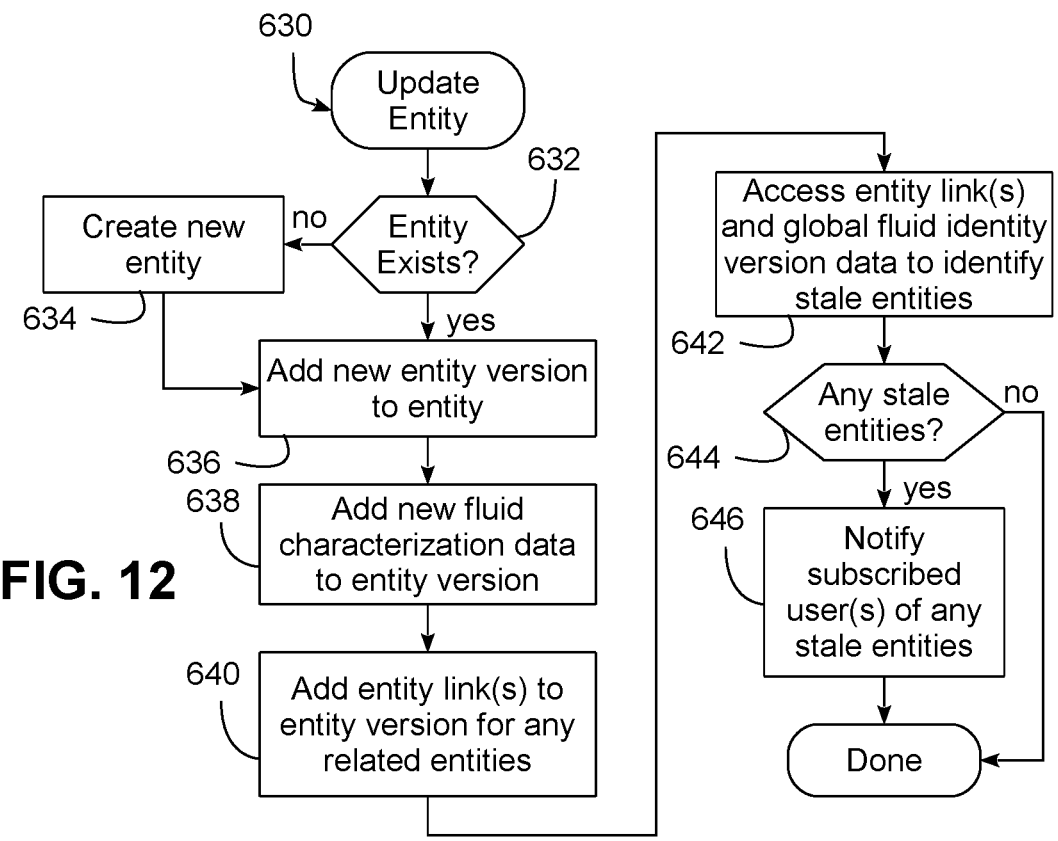
FIG. 12 is a flowchart illustrating an example sequence of operations for updating an entity in the global fluid identity repository of FIG. 4.
Figure 13:
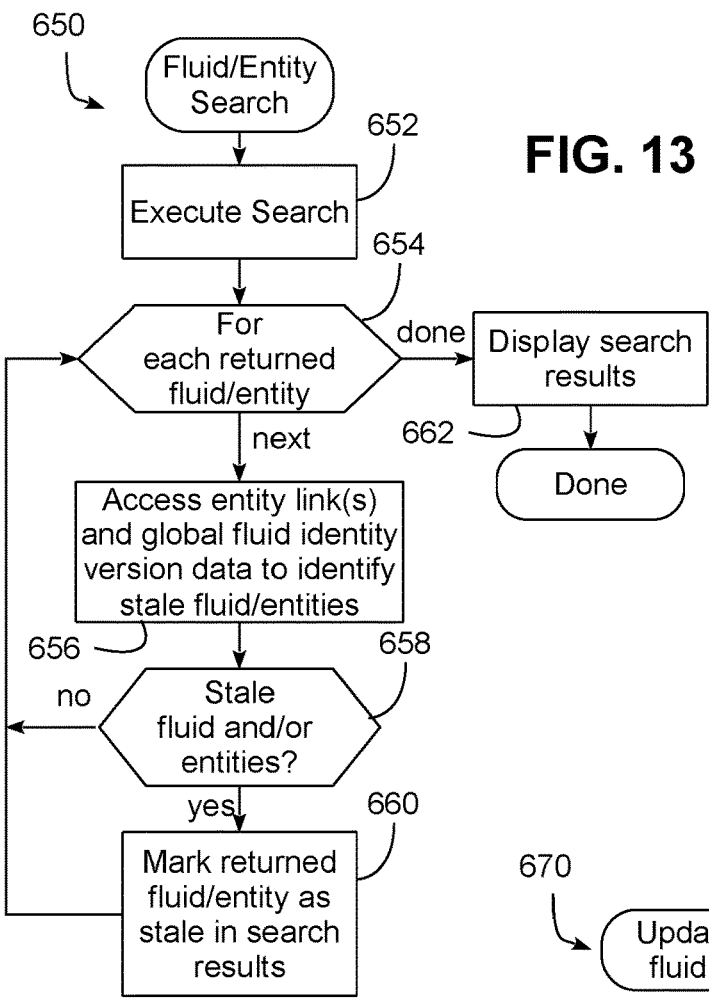
FIG. 13 is a flowchart illustrating an example sequence of operations for conducting a fluid or entity search in the global fluid identity repository of FIG. 4.
Figure 14:
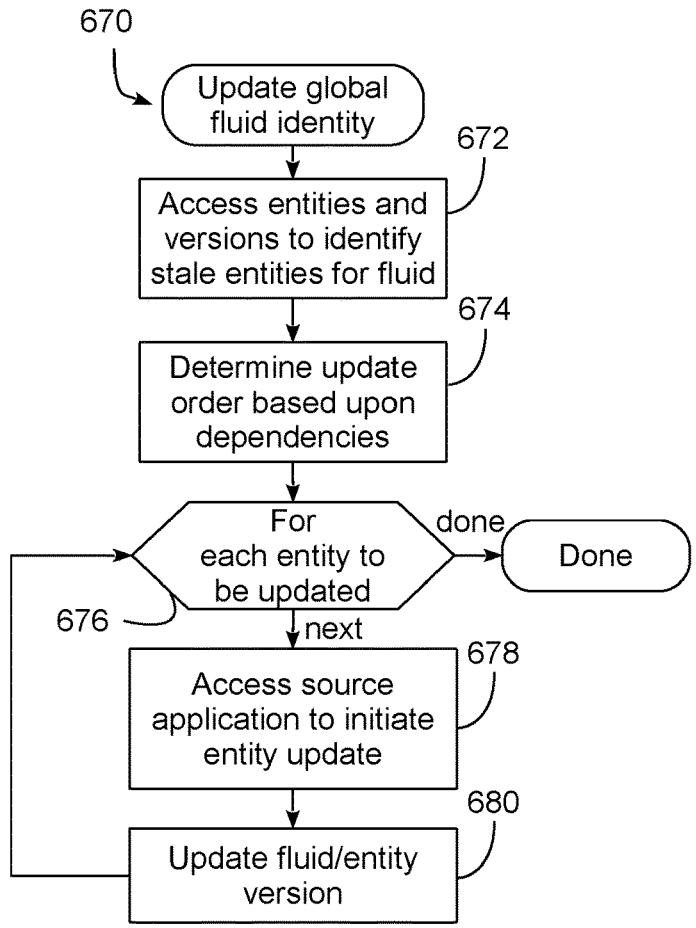
FIG. 14 is a flowchart illustrating an example sequence of operations for updating a global fluid identity in the global fluid identity repository of FIG. 4.

FIGS. 12-14 next illustrate a number of example routines that may be executed by a computing device in connection with a global fluid identity repository consistent with the invention. FIG. 12, for example, illustrates an example update entity routine 630 that may be implemented within a global fluid identity repository to incorporate new fluid characterization data, e.g., fluid analysis data, experiment data, a fluid model or a simulation artefact, into a global fluid identity.

Routine 630 begins in block 632 by first determining whether the entity associated with the new fluid characterization data already exists. If not, control passes to block 634 to create a new entity in the global fluid identity, and then to block 636 to add a new entity version to the newly-created entity. If the entity already exists, however, block 634 is bypassed and control passes directly from block 632 to block 636 to add the new entity version to the existing entity.

Next, in block 638 the new fluid characterization data is added to the new entity version, and in block 640, one or more entity links (if appropriate) are added to the entity version, e.g., to link the entity version to related fluid characterization data such as fluid sample data or experiment data used to create the new fluid characterization data, to link the entity version to any fluid models or simulation artefacts generated from the new fluid characterization data, etc.

Next, block 642 accesses the entity link and global fluid identity version data to attempt to identity any "stale" entities associated with the global fluid identity. A "stale" entity, in this regard, may refer to some fluid characterization data that no longer represents the most current version of the global fluid identity. For example, where a fluid model or a simulation artefact is generated using certain fluid sample and/or experiment data, and new fluid characterization data is added that supplants some of the fluid sample and/or experiment data from which the fluid model or simulation artefact has been generated, the fluid model or simulation artefact may be considered to be stale to the extent that it is based at least in part on older and/or otherwise different data than represents the current version of the global fluid identity.

Block 644 then determines if any stale entities were identified, and if so, passes control to block 646 to notify any subscribed users and/or applications for the global fluid identity of any identified stale entities. As noted above, notifications may be provided in the form of electronic communications such as instant messages, text messages, emails, pop-up notifications, etc., as well as in-application notifications such as notifications within simulation or fluid modeling applications, notifications within fluid viewer applications, etc., whereby such notifications may be displayed to a user via a user interface such as through the use of text, icons, graphics, animations, audio, etc. Furthermore, as will be discussed in connection with FIG. 14 below, while some notifications may simply alert a user or application of a stale entity, in other instances notifications may be used to trigger automatic updates such as automatic execution of simulations or fluid model updates.

Upon completion of block 646, routine 630 is complete. Moreover, if no stale entities are detected in block 644, block 646 is bypassed, and routine 630 is complete.

FIG. 13 illustrates an example fluid/entity search routine 650 that may be executed by a global fluid identity repository to search for one or more fluids and/or entities matching a search criterion. In some embodiments, for example, a search may be performed based upon one or more tags 616 (FIG. 11), which as noted above may be key/value pairs, and may thus represent various categorizations of fluids and/or entities. Search criteria may be based upon, for example, fluid types, entity types, dates, users, user groups, organizations, reservoirs, wells, locations (e.g., GPS positions), etc., and searches may request retrieval of global fluid identities and/or particular entities or entity types (e.g., simulation artefacts, fluid models, fluid sample data, experiment data, etc.

Routine 650 may therefore be provided with a search criterion, e.g., through a user interface or an API, via structured, free-form or natural language formats, etc., and may execute the search in block 652. Then, for each matching fluid and/or entity in the search results, block 654 passes control to block 656 to access the relevant entity links and global fluid identiy version data to identify any stale fluids and/or entities, e.g., in a similar manner to that described above in connection with routine 630 of FIG. 12. If the returned fluid/entity is stale, block 658 passes control to block 660 to mark the returned fluid or entity as stale in the search results, and control returns to block 654. If the fluid or entity is not stale, block 660 is bypassed. Once all search results are processed, block 654 then passes control to block 662 to display the search results, with the search results associated with a stale fluid or entity highlighted in the search to notify a user of which search results are stale (and potentially need to be updated). Further, in some embodiments, user controls may be incorporated into the search results to enable a user to initiate updates to any stale fluid and/or entity identified in the results.

Now turning to FIG. 14, this figure illustrates an example update global fluid identity routine 670 that may be executed by a global fluid identity repository in order to update a global fluid identity, and if appropriate, initiate updates to one or more entities associated with a global fluid identity in response to an update made to a different entity associated with the global fluid identity. In particular, routine 670 begins in block 672 by accessing entities and versions associated with the global fluid identity to identify one or more stale entities for a fluid. For example, after an update to a fluid sample or experiment entity that incorporates new fluid samples or lab analysis results, any fluid model and/or simulation artefact entities generated using prior versions of such data may be considered to be stale. Control then passes to block 674 to determine an update order based upon dependencies between entities. For example, in the case of both fluid model and simulation artefact entities being stale, generally a simulation artefact is generated using a fluid model, so updates to a simulation may generally be considered to be dependent on updates being made to a fluid model so that an updated fluid model can be used to generate a new version of a simulation artefact. It will also be appreciated that multiple downstream fluid models and/or simulation artefacts may be dependent upon particular fluid characterization data, so in some embodiments multiple fluid models and/or simulation artefacts may be updated during one execution of routine 670.

Once an update order is determined, block 676 then initiates a FOR loop to process each entity to be updated, and in the order determined in block 674. For each such entity, block 678 access the source application associated with such entity to initiate an entity update. In some embodiments, the entity update may be completely automated, and may be performed without user input. In other embodiments, however, an entity update may be based in part on user input, e.g., by opening a source application to permit a user to perform the entity update and/or by using a "wizard" or workflow to guide a user to perform the update. In other embodiments, however, a user may simply be notified of the need to update an entity.

Next, block 680 updates the fluid and associated entity version based upon the update made to the entity in block 678, and control returns to block 676 to update additional entities, and once all entities are updated, routine 670 is complete. Thus, entities that have become stale as a result of updates to other entities may be updated in an automated and/or guided fashion to reduce the likelihood of entities being stale when accessed by a user.

In some embodiments, routine 670 may also be called in response to a user access to a global fluid identity or entity, e.g., after a user opens a fluid model or a simulation artefact in a fluid modeling application or simulation application and it is determined that at least a portion of the data the user is accessing is stale. As one example, a user may open a fluid model or simulation, a check may be made as to whether the fluid model or simulation is based on stale data, and the user may be notified and prompted to automatically update the fluid model or simulation. As another example, after a user updates a fluid model, an option may be provided to automatically update all simulation artefacts based on that fluid model, or after a user updates fluid sample or experiment data, an option may be provided to automatically update all fluid models and/or simulation artefacts based thereon.

It will be appreciated that the manner in which global fluid identities and entities associated therewith may be stored, represented and/or managed in a number of different manners. As but one example, a markup language such as PRODML may be used in some embodiments. It will also be appreciated that fluid models may be represented in a number of manners in different embodiments, e.g., based upon different numbers and combinations of components and/or pseudocomponents. Simulation artefacts may be generated from various types of simulations, e.g., reservoir flow simulations, production simulations, facilities simulations, surface network simulations, wellbore simulations, integrated asset simulations, and other simulations that may be based in part on fluid characteristics.

A global fluid identity repository may therefore support in some embodiments a collaborative environment in which to create, evaluate, update and use fluid characteristic data in connection with exploration, appraisal, design and/or production of oilfield assets. A chain of custody may be maintained in association with a fluid as a global fluid identity may be used to ensure an understanding of what underlying data sets are used to create what models and/or simulation artefacts. An environment may cross multiple source applications, multiple users, multiple user groups and/or multiple organizations, and iterative evolution of a global fluid identity may be supported. As an example, over the lifetime of a fluid, initial down hole fluid samples may be obtained during early stage exploration and a global fluid identity may be created. Lab analysis may be performed of the fluid samples to generate additional experiment data, and the fluid sample and experiment data may both be incorporated into the global fluid identity, and initial fluid models may be created and/or initial simulations may be run.

Thereafter, additional fluid samples may be collected, e.g., from production wells, and additional lab analysis may be performed, resulting in the generation of additional fluid characterization data that can be used to tune or refine the initial fluid models and/or rerun simulations. These steps may occur iteratively a number of times, and updates may be iteratively made to the global fluid identity, incorporating notifications and/or automated updates to other entities based upon other updates made to the global fluid identity, while also enabling prior versions to be reconstructed and accessed if desired.

Further, in some instances, users associated with fluid modeling and/or simulation may determine that additional fluid characterization data would be helpful to generate better results, and as such, in some embodiments a global fluid identity repository may further support ordering testing and/or fluid sample collecting from appropriate personnel, e.g., using a messaging system and/or an order tracking system to initiate testing and/or collection procedures and manage the progress thereof.

Although the preceding description has been described herein with reference to particular means, materials, and embodiments, it is not intended to be limited to the particular disclosed herein. Furthermore, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method, comprising:
    maintaining, in a cloud platform, a computer-implemented global fluid identity repository of a plurality of global fluid identities, each global fluid identity including fluid characterization data characterizing a fluid associated with a reservoir in a subsurface formation, wherein the plurality of global fluid identities includes a first global fluid identity for a first fluid, and wherein the fluid characterization data for the first global fluid identity includes at least one of fluid sample data and experiment data characterizing the first fluid, fluid model data defining a containerized fluid model, and simulation result data generated from a simulation performed with the containerized fluid model, wherein the containerized fluid model is stored in a container of the cloud platform;
    in response to a first application programming interface call to the computer-implemented global fluid identity repository from a first fluid modeling application, publishing a first version of the containerized fluid model for the first global fluid identity for storage to the container of the cloud platform;
    in the computer-implemented global fluid identity repository, tracking changes made to the first global fluid identity;
    when tracking changes in the computer-implemented global fluid identity repository, detecting a change to the first version of the containerized fluid model for the first global fluid identity responsive to a second application programming interface call from a second fluid modeling application to publish a second version of the containerized fluid model for the first global fluid identity for storage to the container of the cloud platform;
    in response to detecting the change, determining that the first version of the containerized fluid model data for the first global fluid identity is stale; and
    in response to determining that the first version of the containerized fluid model data for the first global fluid identity is stale, generating a notification indicating that the first version of the containerized fluid model for the first global fluid identity is stale.

2. The method of claim 1, wherein generating the notification includes generating the notification for display in a simulation application.

3. The method of claim 1, wherein generating the notification includes generating the notification for display in a fluid viewing application.

4. The method of claim 1, wherein generating the notification includes generating the notification for display in one or more fluid modeling applications.

5. The method of claim 1, wherein generating the notification includes generating an electronic message for display to a user, the electronic message including a text message, an email or a pop-up notification.

6. The method of claim 1, further comprising automatically initiating an update to the second version of the containerized fluid model for the first global fluid identity in response to determining that the fluid model data for the first global fluid identity is stale, wherein the automatically initiating the update stores a third version of the containerized fluid model in the container of the cloud platform.

7. The method of claim 6, further comprising:
    determining that the simulation result data for the first global fluid identity is stale; and
    after automatically initiating the update to the second version of the containerized fluid model for the first global fluid identity, automatically initiating an updated simulation for the first global fluid identity using the third version of the containerized fluid model.

8. The method of claim 1, wherein each global fluid identity in the global fluid identity repository includes a plurality of entities storing the fluid characterization data therefor.

9. The method of claim 8, wherein at least one entity among the plurality of entities includes one or more entity links to other entities among the plurality of entities to represent dependencies between linked entities.

10. The method of claim 8, wherein at least one entity among the plurality of entities identifies one or more source applications for fluid characterization data associated with the at least one entity.

11. The method of claim 8, wherein the plurality of entities includes a model entity associated with fluid model data and an artefact entity associated with simulation result data.

12. The method of claim 1, wherein the cloud platform includes a search and retrieval service executing in a service container of the cloud platform, wherein the second fluid modeling application accesses the first version of the containerized fluid model using the search and retrieval service.

13. The method of claim 12, wherein the cloud platform includes a publish service executing in a service container of the cloud platform, wherein the second version of the containerized fluid model is published using the publish service.

14. The method of claim 13, wherein the cloud platform includes a notification service, wherein the notification indicating that the first version of the containerized fluid model for the first global fluid identity is stale is issued using the notification service.

15. An apparatus, comprising:
    a computer-implemented global fluid identity repository maintaining, in a cloud platform, a plurality of global fluid identities, each global fluid identity including fluid characterization data characterizing a fluid associated with a reservoir in a subsurface formation, wherein the plurality of global fluid identities includes a first global fluid identity for a first fluid, and wherein the fluid characterization data for the first global fluid identity includes at least one of fluid sample data and experiment data characterizing the first fluid, fluid model data defining a containerized fluid model, and simulation result data generated from a simulation performed with the containerized fluid model, wherein the containerized fluid model is stored in a container of the cloud platform; and program code resident in a non-transitory storage of the cloud platform for the computer-implemented global fluid identity repository and configured upon execution by at least one processing unit of the cloud platform to:
- in response to a first application programming interface call to the computer-implemented global fluid identity repository from a first fluid modeling application, publish a first version of the containerized fluid model for the first global fluid identity for storage to the container of the cloud platform;
- track changes made to the first global fluid identity;
- when tracking changes in the computer-implemented global fluid identity repository, detect a change to the first version of the containerized fluid model for the first global fluid identity responsive to a second application programming interface call from a second fluid modeling application to publish a second version of the containerized fluid model for the first global fluid identity for storage to the container of the cloud platform;
- in response to detecting the change, make a determination that the first version of the containerized fluid model data for the first global fluid identity is stale; and
- in response to the determination that the first version of the containerized fluid model data for the first global fluid identity is stale, generate a notification indicating that the first version of the containerized fluid model for the first global fluid identity is stale.

16. A program product, comprising:
a non-transitory computer readable medium; and
program code stored on the non-transitory computer readable medium and configured upon execution by at least one processing unit to maintain, in a computer-implemented global fluid identity repository of a cloud platform, a plurality of global fluid identities, each global fluid identity including fluid characterization data characterizing a fluid associated with a reservoir in a subsurface formation, wherein the plurality of global fluid identities includes a first global fluid identity for a first fluid, and wherein the fluid characterization data for the first global fluid identity includes at least one of fluid sample data and experiment data characterizing the first fluid, fluid model data defining a containerized fluid model, and simulation result data generated from a simulation performed with the containerized fluid model, wherein the containerized fluid model is stored in a container of the cloud platform, the program code further configured to:
- in response to a first application programming interface call to the computer-implemented global fluid identity repository from a first fluid modeling application, publish a first version of the containerized fluid model for the first global fluid identity for storage to the container of the cloud platform;
- track changes made to the first global fluid identity;
- when tracking changes in the computer-implemented global fluid identity repository, detect a change to the first version of the containerized fluid model for the first global fluid identity responsive to a second application programming interface call from a second fluid modeling application to publish a second version of the containerized fluid model for the first global fluid identity for storage to the container of the cloud platform;
- in response to detecting the change, make a determination that the first version of the containerized fluid model data for the first global fluid identity is stale; and
- in response to the determination that the first version of the containerized fluid model data for the first global fluid identity is stale, generate a notification indicating that the first version of the containerized fluid model for the first global fluid identity is stale.

* * * * *